United States Patent [19]

Peterson

[11] 4,349,963
[45] Sep. 21, 1982

[54] ROTARY CUTTING WHEEL AND METHOD OF MAKING

[75] Inventor: Francis C. Peterson, St. Charles, Ill.

[73] Assignee: Illinois Tool Works Inc., Chicago, Ill.

[21] Appl. No.: 223,080

[22] Filed: Jan. 7, 1981

[51] Int. Cl.³ .................. B26B 25/00; B26D 1/14; B21K 19/00

[52] U.S. Cl. .................. 30/347; 29/148.3; 72/379; 76/101 A

[58] Field of Search ........ 30/347; 76/101 A, 101 SM, 76/85; 72/352, 360, 379; 29/148.3; 83/676

[56] References Cited

U.S. PATENT DOCUMENTS

| | | | |
|---|---|---|---|
| 655,484 | 8/1900 | Hannum | 76/101 SM |
| 1,248,330 | 11/1917 | Huish et al. | 30/347 X |
| 1,558,372 | 10/1925 | Killman | 30/416 |
| 1,614,332 | 1/1927 | Woods | 76/101 A |
| 2,244,846 | 6/1941 | Moeller | 30/426 |
| 2,467,302 | 4/1949 | Forster | 76/101 A |
| 2,472,876 | 6/1949 | Ahrndt et al. | 30/400 |
| 3,055,249 | 9/1962 | Lord | 83/501 |
| 3,159,196 | 12/1964 | Engi | 83/860 |
| 3,168,884 | 2/1965 | Williams | 72/352 X |
| 3,213,514 | 10/1965 | Evans | 29/148.3 |
| 3,507,638 | 4/1970 | Wilburn | 65/70 |
| 4,167,132 | 9/1979 | Zontelli | 83/676 |

Primary Examiner—Jimmy C. Peters
Attorney, Agent, or Firm—Thomas W. Buckman

[57] ABSTRACT

A rotary cutting or shearing wheel of one-piece configuration formed from sheet stock including an extruded hub section and a dome wheel section including a cold formed, feathered, cutting edge at the outer periphery.

6 Claims, 3 Drawing Figures

ROTARY CUTTING WHEEL AND METHOD OF MAKING

This invention relates generally to rotary cutting blades for can openers and more particularly to a one-piece cutter wheel for such environment and a method of making same.

Prior art rotary cutting blades of the type generally described are typically disc-like shearing knives of carbon steel configured so that the thickness is tapered from the axis to the cutting edge enabling the cutting edge to be subsequently sharpened and resharpened. It is also common practice in the prior art to produce such devices as screw machine products and, as such, a separate hardening step is required to produce the required strength and hardness for the cutting operation.

It is accordingly an object of this invention to produce a one-piece cutter device from a sheet metal stock.

A further object of the invention is to produce a can opener cutting disc using a cold forming method which eliminates a hardening step.

These and other objects and advantages of the invention will become apparent upon reading the following detailed description and upon reference to the drawings.

DETAILED DESCRIPTION OF THE PREFERRED EMBODIMENT

Figure 2:
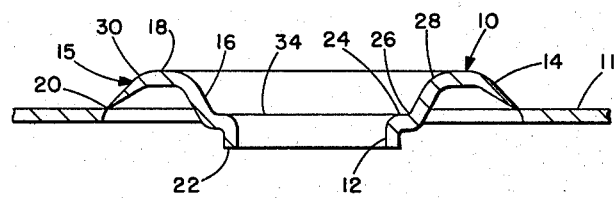
FIG. 2 is a central sectional view of the cutter wheel shown in FIG. 1 as taken along lines 2—2 of FIG. 1 and also depicting the manner in which the device is formed from the strip stock.

Referring now in detail to the drawings it will be shown that the one-piece rotary cutting wheel 10 can be described as including two basic sections, hub portion 12 and radially outwardly extending wheel portion 15. As shown more clearly in FIG. 2 the domed wheel consists of concentric inner and outer wheel sections 16 and 14 respectively which are joined by a bridge section 18. Each of the inner and outer wheel sections are generally frustoconical but for purposes of this description it should be understood that frustoconical can of course encompass a section that is also convex or concave as long as each section 16 and 14 include a small diameter and large diameter as will be described later herein.

It is important to recognize that the wheel 10 is advantageously formed from a sheet of strip stock 11. A first preferred step in the manufacture of this device is to create a pilot hole centered on the axis of the wheel and to extrude a hub section 12 in one direction relative to the strip 11. This extruding step thus creates a hub of predetermined axially dimension having a first extremity 22 representing a free extremity and a second extremity 24 representing the extremity which is merged with the outer wheel portion 15.

A second preferred step in the manufacture of the wheel 10 is a cold forming step whereby the material which is radially outwardly of the hub is deformed away from the strip 11 in a direction opposite the hub extruding step. In practice it is preferred that this be done with mating dies and which are designed to cold form and grain orient the outer most regions of the wheel. These outer most regions are shown to be tapered into a sharp cutting edge 20. It is this cold forging in the forming step that effectively hardens the cutting edge eliminating the necessity for a separate hardening step.

Figure 1:
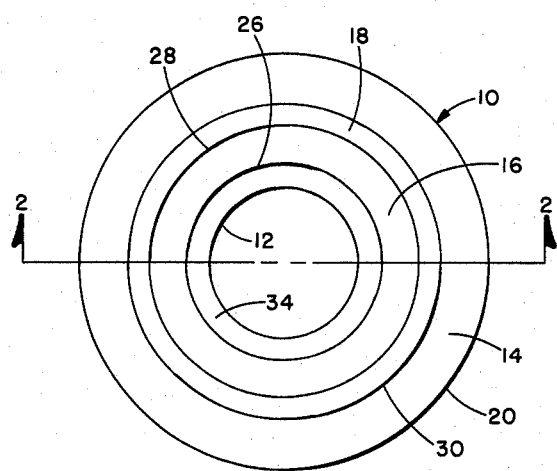
FIG. 1 is a top plan view of the one-piece rotary cutter wheel of the invention.

Turning once again to FIGS. 1 and 2, it will be shown that a dome like bridging section 18 innerconnects the outer and inner wheel sections 14 and 16 respectively. The small diameter extremity 26 of the inner wheel section 16 is thus integrally associated with the second hub extremity 24 and the resulting wall extends outwardly and upwardly therefrom to a outer most or larger diameter 28 of the inner section 16. The bridging section, as shown in the preferred embodiment extends outwardly of the region 28 for a predetermined radial extent thus separating and spacing the largest diameter region 28 of the inner 16 and the smallest diameter region 30 of the outer section 14. A coordination of the extent of radial dimension of the bridge section 18, the angle of the cutting edge 20 to the surface to be cut and the diameter of the wheel is of course necessary to obtain optimal results.

The outer cutting section 14 of the wheel is tapered in thickness to a feathered or sharp edge 20, which defines the largest diameter extremity of the general frustoconical section 14.

Figure 3:
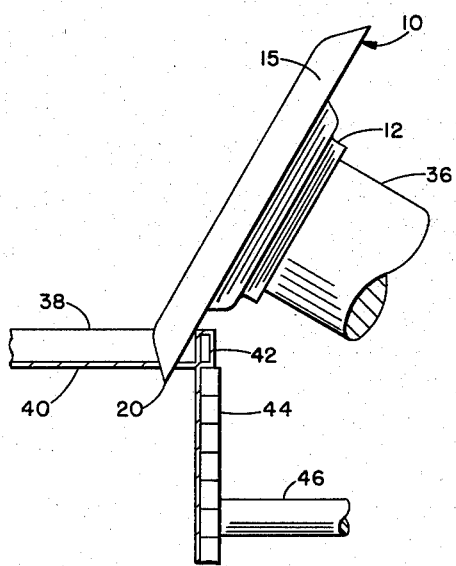
FIG. 3 is a fragmentary elevational view in partial section of the cutting wheel of the instant invention in use as a can opener.

Turning now to FIG. 3 the wheel 10 will be shown in a typical can opener environment. The wheel 10 may be mounted to a rotably shaft 36 in a manner consistent with conventional practices. However, it should be noted that the extrusion step and ultimate production of the hub 12 provide suitable axial bearing surface for such a shaft without requiring a screw machined part. In operation the cutting edge 20 produces a shear-like incision in the lid 40 of a can 38 closely adjacent the rim 42. The combination of the convex or cup-like cutting edge 20 and the inclination of the outer cutting region 14 to the lid 40 produces a reliable separation with a shearing line on the remaining lid segment which is forced outwardly toward the outer walls of the can to reduce the chance that the sheared edges will become exposed. In typical can opener operations a knurled wheel 44 is driven by an appropriate shaft 46 to rotate the can about its axis while permitting the cutting wheel 10 to freely rotate about its axis while shearing the lid 40.

In certain instances it may be important to provide a radially extending ledge 34 at the second extremity 24 of the hub 12. This could provide means for clamping the wheel to a suitable shaft and to stiffen the wheel since it is to be made of relatively thin sheet material. The cold forming step and configuration of the wheel 10, as noted above, results in a oriented and hardened, feathered tip or cutting edge 20 which lies on a plane which also includes the plane of the second extremity of the hub.

Thus it is apparent there has been provided, in accordance with the invention, a one-piece rotary cutter and method of making such a cutter that fully satisfies the objects and advantages set forth above. While the invention has been described in conjunction with a specific embodiment it is apparent that many alternatives, modifications and variations will be evident to those skilled in the art in light of the foregoing description. Accordingly it is intended to embrace all such alternatives, modifications and variations which may fall in the spirit and broad scope of the appended claims.

I claim:

1. A one-piece sheet metal rotary cutting wheel for a can opener including a hub portion of predetermined diameter and axial dimension which includes a first, free, axial extremity and a second, axial extremity, integrally merging with a wheel portion, the wheel portion including an inner and outer section interconnected by a bridge section, both the inner and outer section being generally frustoconical, the smallest diameter at the inner section being axially adjacent the second extremity of the hub and merging therewith, the largest diameter of the outer section presenting a cutting edge and also being axially adjacent but radially spaced from the second extremity of the hub, the bridge region thereby interconnected the smaller diameter of the outer section and the larger diameter of the inner section, the outer section tapering in thickness from its smallest diameter and region of maximum thickness to its largest diameter and region of minimum thickness as a result of a cold forming process thereby presenting a hard, sharp, peripheral cutting edge.

2. The rotary cutting wheel of claim 1 wherein all portions of the one-piece wheel are of generally equal thickness except the cold formed and resulting hardened outer wheel section.

3. The rotary cutting wheel of claim 1 wherein the cutting edge defined by the extremity of the larger diameter of the wheel section lies on a plane extending perpendicular to the axis of the hub section, and which plane also includes the second extremity of the hub section.

4. The rotary cutting wheel of claim 1 wherein the bridge is of a predetermined radial extent thereby radially separating the smallest diameter of the outer wheel section from the largest diameter of the inner wheel section.

5. The rotary cutter wheel of claim 1 which includes a radially outwardly extending ledge interconnecting the second extremity of the hub and the smallest diameter region of the inner wheel section.

6. A method of producing a rotary cutting wheel for a can opener from a flat sheet metal stock including the steps of extruding a pilot hole axially in a first direction from the stock that produces a hub section of predetermined axial extent, cold forming the stock surrounding the hub in a second opposite direction producing an annular dome which defines one axial extremity of the cutting wheel and simultaneously feathers and cold hardens the outer most periphery thereby creating a hardened cutting blade from sheet stock.

* * * * *